United States Patent
Arndt et al.

(10) Patent No.: US 9,494,991 B2
(45) Date of Patent: Nov. 15, 2016

(54) ENERGY ALLOCATION TO GROUPS OF VIRTUAL MACHINES

(75) Inventors: Richard L. Arndt, Austin, TX (US); Freeman L. Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 859 days.

(21) Appl. No.: 13/444,603

(22) Filed: Apr. 11, 2012

(65) Prior Publication Data

US 2012/0198247 A1 Aug. 2, 2012

Related U.S. Application Data

(63) Continuation of application No. 12/940,639, filed on Nov. 5, 2010.

(51) Int. Cl.
 *G06F 1/00* (2006.01)
 *G06F 1/32* (2006.01)

(52) U.S. Cl.
 CPC ............ *G06F 1/3203* (2013.01); *G06F 1/3287* (2013.01); *Y02B 60/1282* (2013.01)

(58) Field of Classification Search
 CPC .................................... G06F 1/26; G06F 1/32
 USPC ......................................................... 713/300
 See application file for complete search history.

(56) References Cited

U.S. PATENT DOCUMENTS

| | | | |
|---|---|---|---|
| 6,363,515 B1 | 3/2002 | Rajgopal et al. | |
| 6,618,811 B1 | 9/2003 | Berthaud et al. | |
| 6,976,178 B1 | 12/2005 | Kissell | |
| 7,076,671 B2 * | 7/2006 | Espinoza-Ibarra et al. | .. 713/300 |
| 7,155,623 B2 | 12/2006 | Lefurgy et al. | |
| 7,225,441 B2 * | 5/2007 | Kozuch et al. | ................... 718/1 |
| 7,272,732 B2 | 9/2007 | Farkas et al. | |
| 7,346,792 B2 | 3/2008 | Anderson et al. | |
| 7,421,691 B1 | 9/2008 | Hancock et al. | |
| 7,434,011 B2 | 10/2008 | Shue | |
| 7,444,526 B2 | 10/2008 | Felter et al. | |
| 7,496,772 B1 | 2/2009 | Nguyen | |
| 7,644,293 B2 | 1/2010 | Sistla et al. | |
| 7,669,071 B2 | 2/2010 | Cochran et al. | |
| 7,684,876 B2 | 3/2010 | Grgic | |
| 7,702,931 B2 | 4/2010 | Goodrum et al. | |
| 7,971,078 B2 | 6/2011 | Govindan et al. | |
| 8,276,012 B2 | 9/2012 | Hanson et al. | |
| 8,589,556 B2 | 11/2013 | Arndt et al. | |
| 8,707,074 B2 | 4/2014 | Hanson et al. | |
| 9,026,818 B2 | 5/2015 | Hanson et al. | |
| 2002/0138744 A1 | 9/2002 | Schleicher et al. | |

(Continued)

OTHER PUBLICATIONS

Bialecki et al., "In-and Out-of Core BEM Equation Solver with Parallel and Non-Linear Options," International Journal for Numerical Methods in Engineering, Dec. 1996, vol. 39, No. 24 pp. 4215-4242.

(Continued)

*Primary Examiner* — Jaweed A Abbaszadeh
*Assistant Examiner* — Austin Hicks
(74) *Attorney, Agent, or Firm* — Yee & Associates, P.C.; Joseph Petrokaitis

(57) ABSTRACT

A method for managing energy. A processor unit identifies a plurality of groups of virtual machines in a computer system. The processor unit allocates the energy in the computer system to the plurality of groups of virtual machines based on a policy.

11 Claims, 7 Drawing Sheets

(56) References Cited

U.S. PATENT DOCUMENTS

| | | |
|---|---|---|
| 2005/0268078 A1 | 12/2005 | Zimmer et al. |
| 2006/0155415 A1 | 7/2006 | Lefurgy et al. |
| 2007/0136614 A1 | 6/2007 | Heath et al. |
| 2008/0005591 A1 | 1/2008 | Trautman et al. |
| 2008/0201710 A1 | 8/2008 | Anderson et al. |
| 2008/0222435 A1 | 9/2008 | Bolan et al. |
| 2008/0263373 A1 | 10/2008 | Meier et al. |
| 2009/0113221 A1 | 4/2009 | Holle et al. |
| 2009/0119233 A1 | 5/2009 | Dunagan et al. |
| 2009/0125293 A1 | 5/2009 | Lefurgy et al. |
| 2009/0254660 A1 | 10/2009 | Hanson et al. |
| 2010/0011227 A1 | 1/2010 | Govindan et al. |
| 2010/0030392 A1 | 2/2010 | Ferentz et al. |
| 2010/0100757 A1 | 4/2010 | Takada et al. |
| 2010/0131957 A1 | 5/2010 | Kami |
| 2010/0218014 A1* | 8/2010 | Bozek et al. ......... 713/320 |
| 2010/0218018 A1 | 8/2010 | Parker, Jr. et al. |
| 2010/0332872 A1 | 12/2010 | Hanson et al. |
| 2012/0116599 A1 | 5/2012 | Arndt et al. |
| 2012/0117390 A1* | 5/2012 | Arndt et al. ......... 713/300 |
| 2012/0324263 A1 | 12/2012 | Hanson et al. |
| 2012/0324264 A1 | 12/2012 | Hanson et al. |

OTHER PUBLICATIONS

Bounds et al., "Optimizing the Data Center: New Dell Servers and the Dell Energy Smart Architecture," Dell Power Solutions, Jun. 2009, pp. 22-26.

Hanson et al., "Priority-Based Power Capping in Data Processing Systems," U.S. Appl. No. 13/593,672, filed Aug. 24, 2012, 31 pages.

Preliminary Amendment, dated Aug. 24, 2012, regarding U.S. Appl. No. 13/593,672, 6 pages.

Hanson et al., "Priority-Based Power Capping in Data Processing Systems," U.S. Appl. No. 13/593,717, filed Aug. 24, 2012, 31 pages.

Preliminary Amendment, dated Aug. 24, 2012, regarding U.S. Appl. No. 13/593,717, 7 pages.

Felter et al., "A Performance-Conserving Approach for Reducing Peak Power Consumption in Server Systems," Proceedings of the 19th Annual International Conference on Supercomputing (ICS '05), Jun. 2005, pp. 293-302.

Fischer et al., "A 90nm Variable-Frequency Clock System for a Power-Managed Itaniu-Family Processor," IEEE International Solid-State Circuits Conference Digest of Technical Papers (ISSCC '05), Feb. 2005, pp. 294-296.

Poirier et al., "Power and Temperature Control on a 90nm Itanium-Family Processor," IEEE International Solid-State Circuits Conference Digest of Technical Papers (ISSCC '05), Feb. 2005, pp. 304-305.

Stoess et al., "Energy Management for Hypervisor-Based Virtual Machines," Proceedings of the 2007 USENIX Annual Technical Conference (ATC '07), Jun. 2007, pp. 1-14.

Notice of Allowance, dated Feb. 25, 2011, regarding U.S. Appl. No. 12/172,151, 12 pages.

Office Action, dated Feb. 21, 2012, regarding U.S. Appl. No. 12/495,188, 10 pages.

Notice of Allowance, dated May 24, 2012, regarding U.S. Appl. No. 12/495,188, 5 pages.

Preliminary Amendment, dated Apr. 12, 2012, regarding U.S. Appl. No. 12/940,639, 6 pages.

Office Action, dated Oct. 10, 2012, regarding U.S. Appl. No. 12/940,639, 32 pages.

Final Office Action, dated Apr. 2, 2013 regarding U.S. Appl. No. 12/940,639, 12 pages.

Office Action, dated Mar. 13, 2013, regarding U.S. Appl. No. 12/940,273, 14 pages.

Office Action, dated Oct. 22, 2014, regarding U.S. Appl. No. 13/593,672, 18 pages.

Notice of Allowance, dated Mar. 2, 2015, regarding U.S. Appl. No. 13/593,672, 5 pages.

Office Action, dated Sep. 6, 2013, regarding U.S. Appl. No. 13/593,717, 11 pages.

Notice of Allowance, dated Dec. 5, 2013, regarding U.S. Appl. No. 13/593,717, 8 pages.

Notice of Allowance, dated Jul. 6, 2016, regarding U.S. Appl. No. 12/940,639, 27 pages.

Notice of Allowance, dated Jul. 5, 2013 regarding U.S. Appl. No. 12/940,273 8 pages.

\* cited by examiner

ENERGY ALLOCATION TO GROUPS OF VIRTUAL MACHINES

This application is a continuation of application Ser. No. 12/940,639, filed Nov. 5, 2010, status pending.

BACKGROUND

1. Field

The present disclosure relates generally to managing energy in a computer system and, in particular, to a method and apparatus for managing energy in a computer system that contains virtual machines. Still more particularly, the present disclosure relates to a method and apparatus for allocating the energy in a computer system to virtual machines.

2. Description of the Related Art

Increasingly, large symmetric multi-processor data processing systems are not being used as single large data processing systems. Instead, these types of data processing systems are being partitioned and used as smaller systems. These systems are also referred to as logical partitioned data processing systems. A logically partitioned functionality within a data processing system allows multiple copies of a single operating system or multiple heterogeneous operating systems to be simultaneously run on a single data processing system platform. A partition, within which an operating system image runs, is assigned a non-overlapping subset of the platform's resources. A partition may also be referred to as a "virtual machine." The platform allocable resources include one or more architecturally distinct processors and their interrupt management area, regions of system memory, and input/output adapter bus slots. The virtual machine's resources are represented by the platform's firmware to the operating system image.

Each distinct operating system or image of an operating system running within a platform is protected from each other, such that software errors on one virtual machine cannot affect the correct operation of any of the other virtual machines. This protection is provided by allocating a disjointed set of platform resources to be directly managed by each operating system image and by providing mechanisms for ensuring that the various images cannot control any resources that have not been allocated to that image. Furthermore, software errors in control of an operating system's allocated resources are prevented from affecting the resources of any other image. Thus, each image of the operating system, or each different operating system, directly controls a distinct set of allocable resources within the platform.

With respect to hardware resources in a logical partitioned data processing system, these resources are shared disjointly among various virtual machines. These resources may include, for example, input/output adapters, memory, non-volatile random access memory, and hard disk drives. Each virtual machine within a logical partitioned data processing system may be booted and shut down over and over without having to power-cycle the entire data processing system.

A power cap may be set for a machine, for example, a data processing system, that places an upper bound on the energy that the machine consumes over time. Furthermore, the various hardware resources in the data processing system consume different amounts of energy, depending upon the energy requirements of each virtual machine in the data processing system. The amount of energy a virtual machine consumes may depend upon its processing activities.

For example, a virtual machine with active software applications may consume a large amount of energy due to heavy use of the floating point units of the processors of the machine. Furthermore, one virtual machine may run applications that are considered more critical than applications running on another virtual machine. Moreover, some virtual machines do not operate independently because each virtual machine implements parts of a larger application.

SUMMARY

The different illustrative embodiments provide a method, data processing system, and computer program product for managing energy. A processor unit identifies a plurality of groups of virtual machines in a computer system. The processor unit allocates the energy in the computer system to the plurality of groups of virtual machines based on a policy.

DETAILED DESCRIPTION

Figure 1:
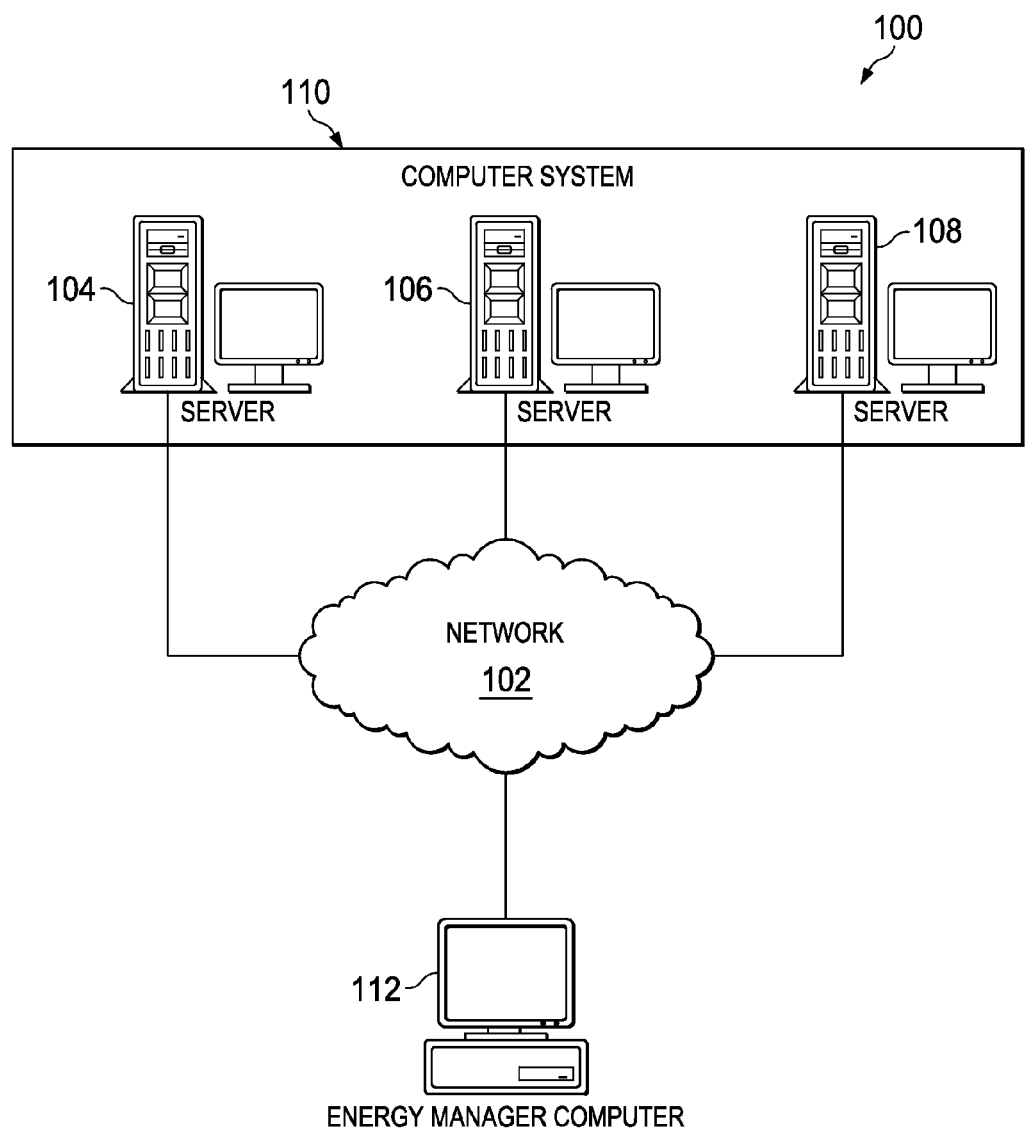
FIG. 1 is an illustration of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The different illustrative embodiments recognize and take into account a number of considerations. For example, the different illustrative embodiments recognize and take into account that different virtual machines may run different applications and therefore require different amounts of energy. For example, a virtual machine with applications that make heavy use of the processors' floating point units may use more energy than another virtual machine. Furthermore, one virtual machine may run more mission-critical applications than another virtual machine.

The different illustrative embodiments recognize and take into account that currently, support for allocating energy to multiple groups of virtual machines is not present. The different illustrative embodiments recognize and take into account that allowing energy to be allocated to different groups of virtual machines may be desirable.

For example, the different illustrative embodiments recognize and take into account that allowing energy to be allocated to multiple groups of virtual machines provides a user or program greater control over managing energy for a data processing system with virtual machines. For example, an energy policy can be implemented that provides more energy to a group of virtual machines that run energy-intensive applications. As another example, one group of virtual machines may be given priority over another for energy allocation when an energy shortage occurs in a data processing system.

With reference now to the figures and, in particular, with reference to FIG. 1, an illustration of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts an illustration of a network of data processing systems in which illustrative embodiments may be implemented. Network data processing system 100 is a cluster of virtualizable systems in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104, server computer 106, and server computer 108 connect to network 102. In the depicted example, server computer 104, server computer 106, and server computer 108 are each a logically partitioned platform with virtual machines. Furthermore, in the depicted example, server computer 104, server computer 106, and server computer 108 are a set of computers grouped together as a computer system 110. A set of computers is one or more computers associated with each other. In addition, energy manager computer 112 connects to network 102.

At least a portion of the instructions to manage energy execute on one or more computers of computer system 110. Energy manager computer 112 may execute a portion of the instructions to manage the energy for computer system 110. In such a case, energy manager computer 112 may be connected to network 102, connected to a server in computer system 110, or may be one or more computers in computer system 110. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to energy manager computer 112 over network 102 for use on energy manager computer 112. Furthermore, program code may be stored on a computer recordable storage medium on energy manager computer 112 and downloaded to server computer 104 over network 102 for use on server computer.

In the depicted example, network data processing system 100 is a cluster of virtualizable systems. FIG. 1 is intended as an example, and not as an architectural limitation for the different illustrative embodiments.

In the different illustrative embodiments, energy may be managed from different sources. For example, a computer program for managing energy for computer system 110 may be stored on server computer 104 or stored among multiple computers in computer system 110. In each case, at least a portion of energy management for computer system 110 is implemented from within the computer system 110. In other illustrative examples, energy for computer system 110 may be managed from another device connected to network 102 or connected to server computer 104, server computer 106, or server computer 108.

Figure 2:
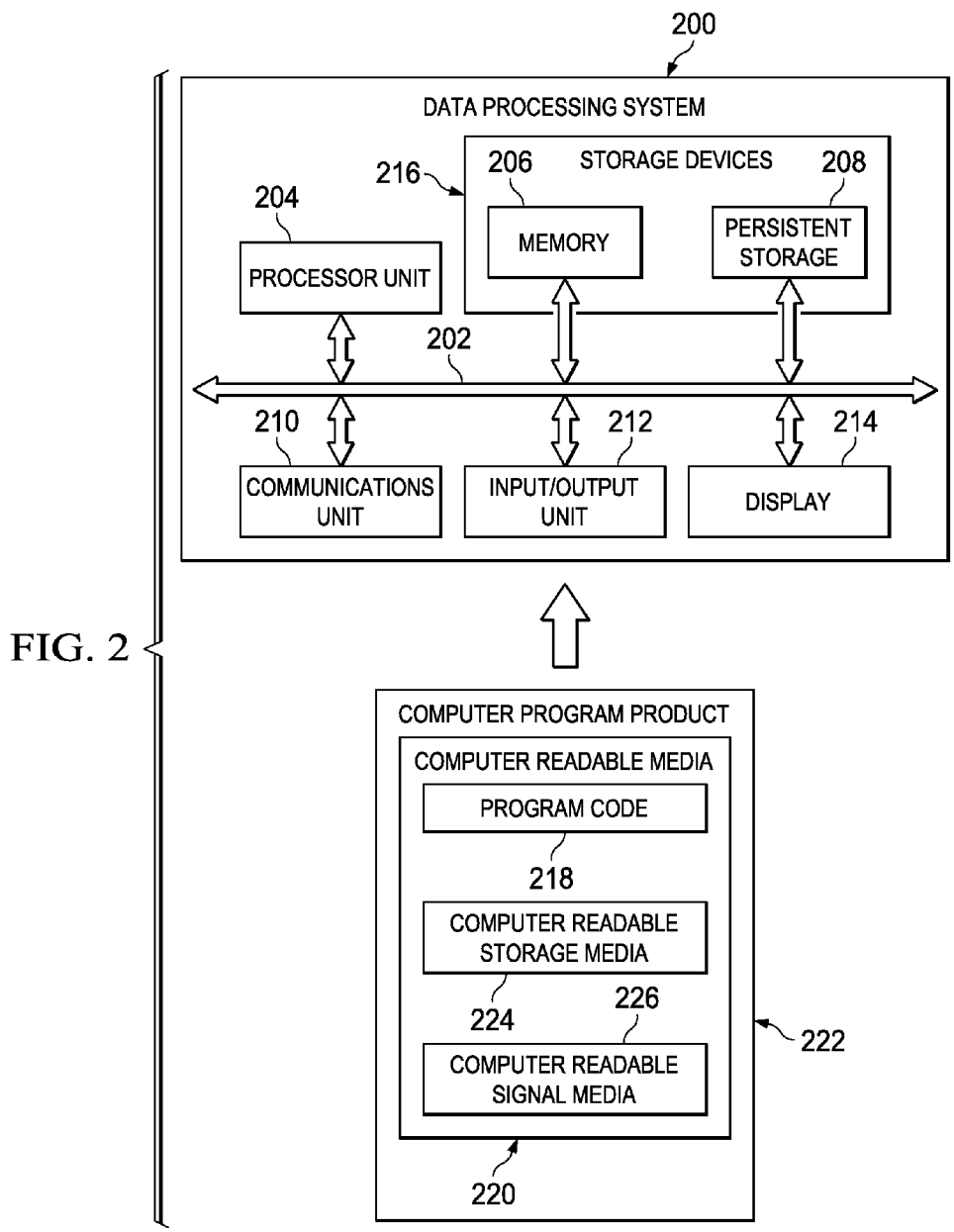
FIG. 2 is an illustration of a data processing system in accordance with an illustrative embodiment.

Turning now to FIG. 2, an illustration of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214. Furthermore, in this illustrative example, data processing system 200 is a logically partitioned platform with virtual machines. Data processing system 200 is an example of one implementation for server computers 104, 106, 108 and energy manager computer 112 in network data processing system 100 in FIG. 1.

Processor unit 204 serves to run instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 or run by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 and run by processor unit 204. Program code 218 and computer readable media 220 form computer program product 222 in these examples. In one example, computer readable media 220 may be computer readable storage media 224 or computer readable signal media 226. Computer readable storage media 224 may include storage devices, such as, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage device, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

Thus, the different illustrative embodiments provide a method and apparatus for managing energy in a computer system that contains virtual machines. A processor unit identifies a plurality of groups of virtual machines in a computer system. The processor unit allocates the energy in the computer system to the plurality of groups of virtual machines based on a policy.

Figure 3:
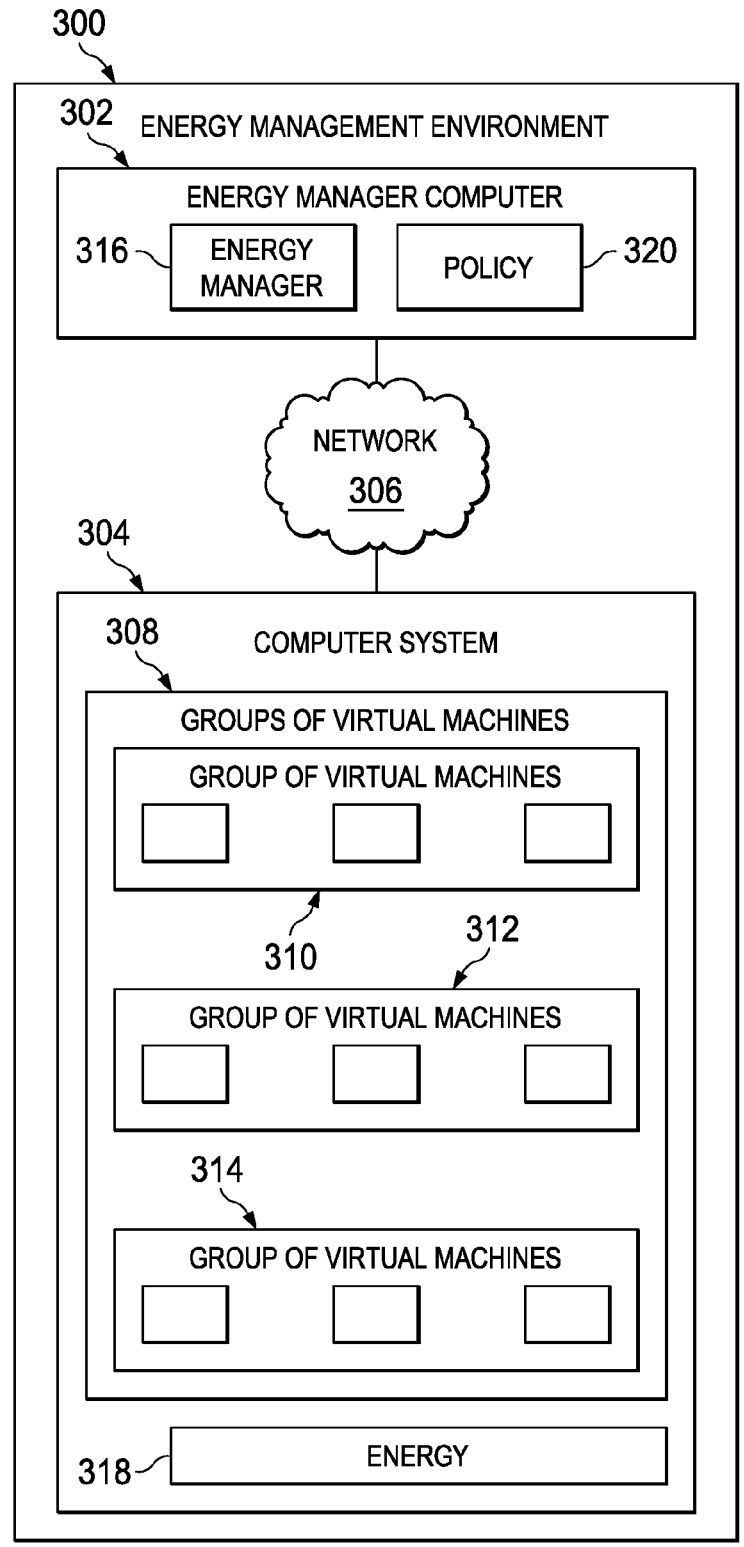
FIG. 3 is an illustration of an energy management environment in accordance with an illustrative embodiment.

With reference now to FIG. 3, an illustration of an energy management environment is depicted in accordance with an illustrative embodiment. Energy management environment 300 may be implemented in network data processing system 100 in FIG. 1. In some illustrative examples, energy management environment 300 may be implemented within a single computer, such as data processing system 200 in FIG. 2. In some illustrative examples, energy management environment 300 may be implemented within a group of computers, such as computer system 110 in FIG. 1. Therefore, the role of energy manager computer 302 may be partially or completely replaced by one or more computers in computer system 304.

In these illustrative examples, energy manager computer 302 communicates to computer system 304 through network 306, as in FIG. 1. In some embodiments, energy manager computer 302 may be a part of computer system 304 or directly connected to computer system 304. For example, energy manager computer 302 may take the form of a console connected to one or more computers of computer system 304. Computer system 304 contains groups of virtual machines 308. In this example, groups of virtual machines 308 contains group of virtual machines 310, group of virtual machines 312, and group of virtual machines 314. Energy manager 316 is a process that runs on energy manager computer 302. Energy manager 316 identifies group of virtual machines 310, group of virtual machines 312, and group of virtual machines 314. Energy manager 316 allocates energy 318 in computer system 304 to groups of virtual machines 308 based on a policy 320.

In these illustrative examples, virtual machines within any particular group may be located on the same computer or may be distributed among multiple computers. Furthermore, virtual machines may be grouped according to application streams, application priorities, all the tiers of the software stack for a particular transaction type, all of the web server partitions for a particular hosting site, or other criteria. For example, computer system 304 may be implemented as a tiered server architecture, in which Tier 1 runs web presentation processes and Tier 2 runs application processes. Thus, virtual machines running on Tier 1 may be in one group and virtual machines running on Tier 2 may be in another group. As another example, all virtual machines participating in a single application stream, across all tiers, may belong to a group. Virtual machines may be grouped in a variety of other ways, depending upon how applications are distributed among computers 308 and 310. Virtual machines may also be grouped according to many other criteria, such as size of virtual machines, location of virtual machines, etc.

The illustration of energy management environment 300 in FIG. 3 is not meant to imply physical or architectural limitations to the manner in which different illustrative embodiments may be implemented. Other policies or combinations of policies may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 4:
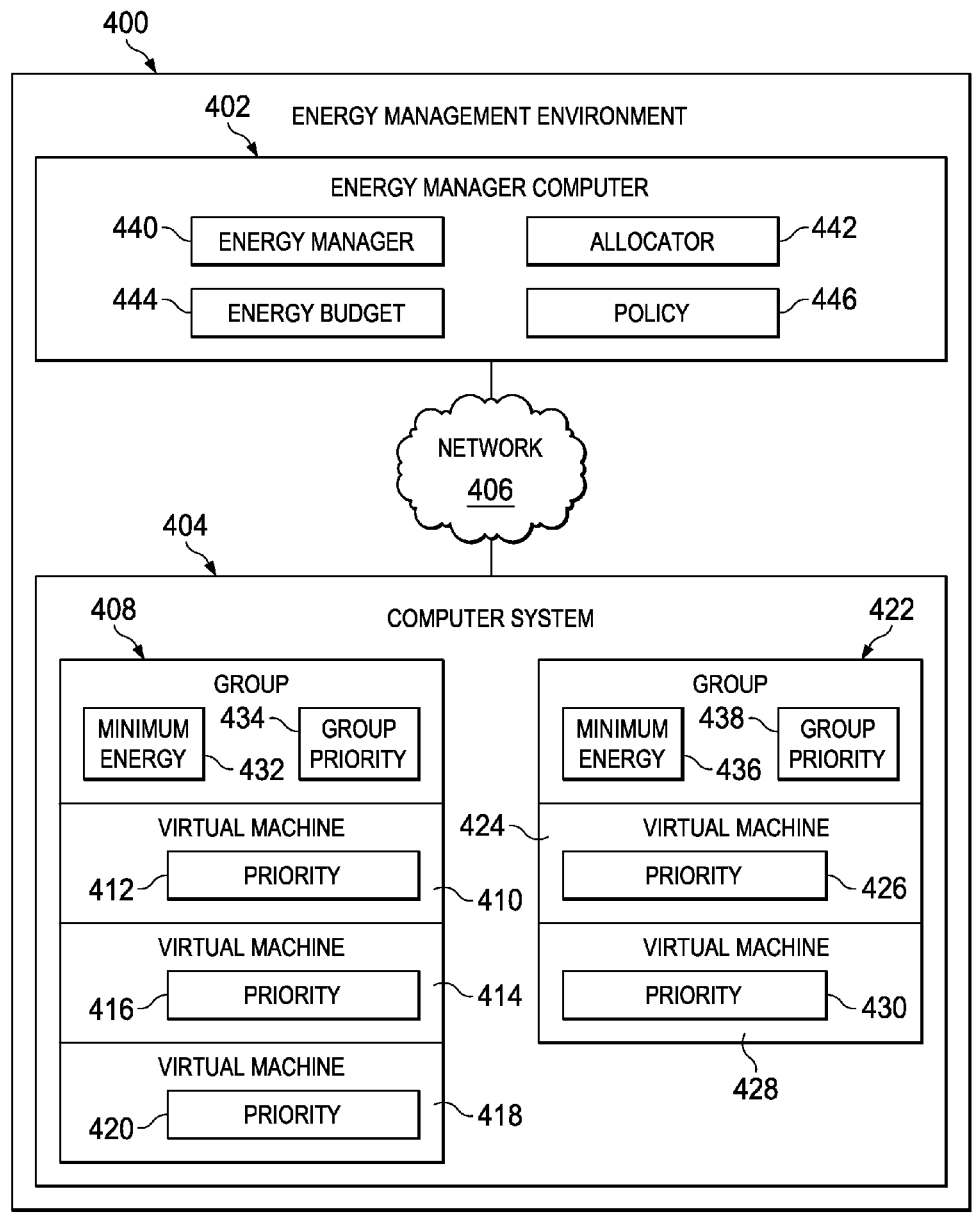
FIG. 4 is an illustration of an energy management environment in accordance with an illustrative embodiment.

With reference now to FIG. 4, an illustration of an energy management environment in accordance with an illustrative embodiment. Energy management environment 400 is an example of an implementation of energy management environment 300 of FIG. 3. In these illustrative examples, energy manager computer 402 communicates to computer system 404 through network 406, as in FIG. 1. Computer system 404 takes the form of a number of computers grouped together, as in FIG. 1. Furthermore, the computers may be in communication with each other. Computer system 404 contains group 408, which in turn contains virtual machine 410 with priority 412, virtual machine 414 with priority 416, and virtual machine 418 with priority 420. Computer system 404 also contains group 422, which in turn contains virtual machine 424 with priority 426 and virtual machine 428 with priority 430. Furthermore, group 408 specifies minimum energy 432 and group priority 434 and group 422 specifies minimum energy 436 and group priority 438.

Minimum energy 436 may specify a minimum amount of energy required for a group for its virtual machines to operate. Minimum energy 436 may also be specified for each virtual machine. Minimum energy 436 is the minimum required energy for the virtual machine to operate at a desired level of performance. For example, a minimum amount of energy is needed to supply processors or hard disk drives in order to process a certain number of application requests at a certain rate. Priorities for groups or virtual machines may determine which groups or virtual machines receive energy first when not enough energy is available to meet the energy demand of all groups.

In these illustrative examples, virtual machines 410, 414, 418, 424, and 428 may be located on the same computer or may be distributed among multiple computers. Furthermore, virtual machines 410, 414, 418, 424 and 428 may be grouped according to various criteria, as described for FIG. 3.

Energy manager computer 402 contains energy manager 440. Energy manager 440 is a process that identifies groups 408 and 422 and instructs allocator 442 to allocate an amount of energy specified by energy budget 444 to groups 408 and 422. In this example, allocator 442 is a process separate from energy manager 440. In other implementations, energy manager 440 may allocate the energy instead of instructing allocator 442 to allocate the energy. Allocator 442 may also allocate energy to each virtual machine. Policy 446, in conjunction with minimum energies 432 and 436, group priorities 434 and 438, and priorities 412, 416, 420, 426 and 430, determines how the energy is allocated to groups 408 and 422. For example, allocator 442 may allocate energy to group 408 according to policy 446 and minimum energy 432. As another example, if group priority 434 is higher than group priority 438, then allocator 442 may allocate energy to group 408 before allocating energy to group 422. Similarly, if priority 412 is higher than priority 416, then allocator 442 may allocate energy to virtual machine 410 before allocating energy to virtual machine 414.

Thus, energy manager 440 may implement a variety of power and energy management schemes, such as priority-based power capping of virtual machines, power and energy accounting for virtual machines, and energy budgets for each virtual machine. Design considerations such as the bulk power supply, the line cords, or the internal distribution system may determine energy budget 444 for groups 408 and 422. As another example, a client-specific power cap may be imposed for installation planning purposes or to manage costs for the client.

For example, group 408 has more energy than needed and group 422 does not have enough energy to meet its energy needs. Thus, group 408 is in a first group and group 422 is in a second group. Starting with the group in the first group with the most restrictive energy policy, energy may be shifted from the first group to the second group. The above process can be repeated for the next group in the first group until the energy needs of the groups in the second group are met. If an energy deficit exists after the above process, then the process can be repeated for each group in the first group using the next least restrictive energy policy.

Once all groups have enough energy to meet energy needs, excess energy can be assigned within each group to virtual machines according to policy 446, a policy for each group, or a policy for each virtual machine. For example, the above process of shifting energy may be applied to virtual machines within a group. Furthermore, excess energy may be allocated in other ways. For example, excess energy may be returned to a computer system pool for reallocation or other uses.

The illustration of energy management environment 400 in FIG. 4 is not meant to imply physical or architectural limitations to the manner in which different illustrative embodiments may be implemented. Other policies or combinations of policies may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, energy manager 440 may implement policy 446 to divide time into intervals and determine the allocation of energy to groups 408 and 422 for the next time interval. Each group 408 and 422 is assigned a share of the total energy based on the policy 446. Each share is an energy budget for the group. Similarly, there may be an energy budget for each virtual machine in the group. Energy allocation schemes, from most restrictive to least restrictive, may include fixed equal shares, fixed specific shares, reservation with recapture of unused energy by other groups, reservation with release of unused energy for energy-saving actions, and observation based on demand. The above energy allocation schemes may also be used to allocate energy to each virtual machine within a group based upon the energy allocated to the group. Moreover, energy manager 440 may adjust the share of energy for each group 408 and 422 at different time intervals based upon policy 446.

Furthermore, policy 446 may establish group energy budgets and virtual machine energy budgets based on energy budget 444. Energy manager 440 enforces energy budget 444 at a system level. Energy manager 440 may first enforce group energy budgets and then virtual machine energy budgets. As long as energy budget 444 is met, there are no system-wide enforcement actions such as throttling. Throttling involves reducing an amount of energy provided to various components of computer system 404. If demand for energy exceeds energy budget 444, energy manager 440 may implement enforcement actions, from least restrictive to most restrictive allocation schemes.

Energy manager 440 may implement various enforcement actions if the energy demand for groups 408 and 422 exceeds energy budget 444. For example, minimum energy 432 and 436 may be based on the limits on the ranges of throttling. Alternatively, minimum energy 432 and 436 may be based on a policy decision about a desired level of performance.

As another example, energy manager 440 may take enforcement actions against specific groups. For example, if group 408 is requires more or less than its allocated share of energy, then during the next time interval, its share of energy will be adjusted. Furthermore, groups may be divided into groups that have more energy than is needed and groups that do not have enough energy to meet energy needs. Groups that do not have enough energy to meet energy needs may include groups with virtual machines that are running slower or not operating at all because the associated hardware is not supplied with enough energy. For example, hard drives may not be powered or a processor may run slower. Moreover, a group may require less energy if associated hardware is idle or is used less. In such cases, the associated hardware may require less energy and may be turned off in order to save energy and reduce operating costs.

Figure 5:
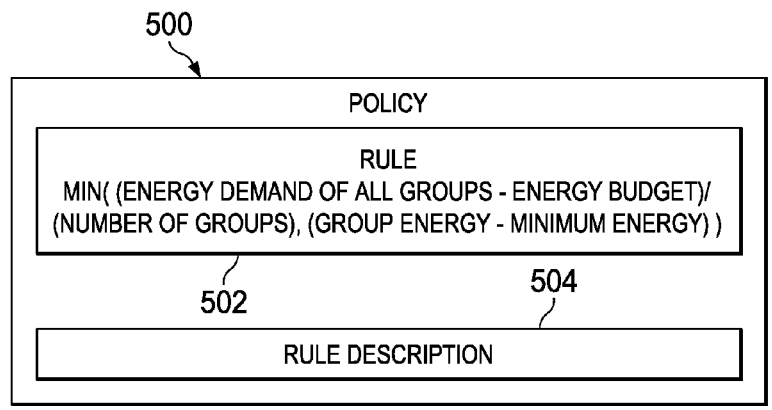
FIG. 5 is an illustration of a policy for allocating energy in accordance with an illustrative embodiment.

With reference now to FIG. 5, an illustration of a policy for allocating energy is depicted in accordance with an illustrative embodiment. In this example, policy 500 is an example of an implementation of policy 446 in FIG. 4. Policy 500 is used by energy manager 440 in FIG. 4. Policy 500 includes rules 502 and 504 that describe how to implement policy 500. Allocator 442 may enforce different rules based upon the desired energy allocation scheme. For example, rule 502 may describe how to implement observation based on demand and rule 504 may describe how to implement fixed specific shares.

For example, for a scheme using observation based on demand, allocator 442 may enforce rule 502. For energy allocated to groups 408 and 422, the allowed enforcement against group 408 is the smaller of its proportional share of energy and the maximum enforcement allowed, as shown in FIG. 5 for rule 502: min((energy demand of both groups 408 and 422—energy budget 444)/2, (group 408 energy—minimum energy 432)). If energy demand continues to exceed energy budget 444, enforcement may be repeated using the next most restrictive policy. This may continue until energy demand equals energy budget 444, energy demand no longer exceeds energy budget 444, or until there are no more groups left to enforce energy restrictions upon. Moreover, the above method may take into account priorities 434 and 438. For example, if priority 434 is higher than priority 438, then energy policies may be more restrictive for group 422 than for group 408.

Figure 6:
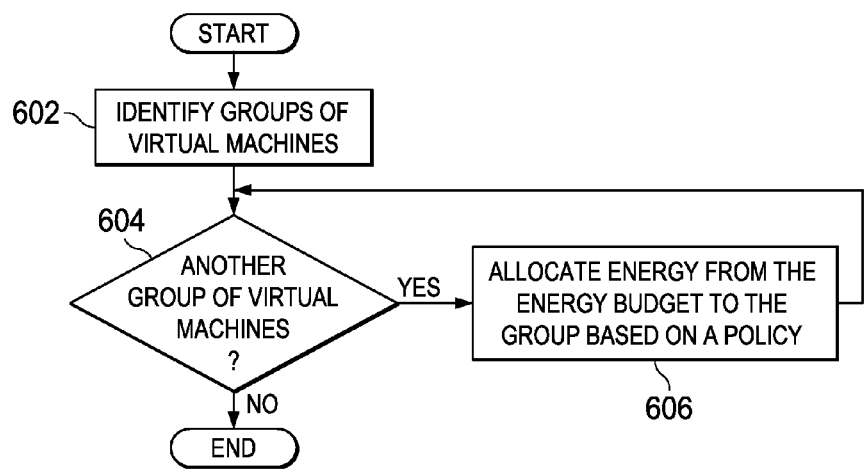
FIG. 6 is an illustration of a flowchart of a process for managing energy in accordance with an illustrative embodiment.

With reference now to FIG. 6, an illustration of a flowchart of a process for managing energy is depicted in accordance with an illustrative embodiment. The process illustrated in FIG. 6 may be implemented in an energy management environment, such as energy management environment 300 in FIG. 3. In particular, this process may be implemented by energy manager 316 in FIG. 3.

The process begins by identifying groups of virtual machines (step 602). The process then determines whether another group of virtual machines to be allocated energy is present (step 604). If another group is not present for allocating energy, the process terminates. With reference again to step 604, if another group is present for allocating energy, the process allocates energy from the energy budget to the group based on a policy (step 606). The policy may include at least one of a pre-defined allocation scheme, a policy for each group of virtual machines, and an observed behavior of each group of virtual machines. The process then returns to step 604.

Figure 7:
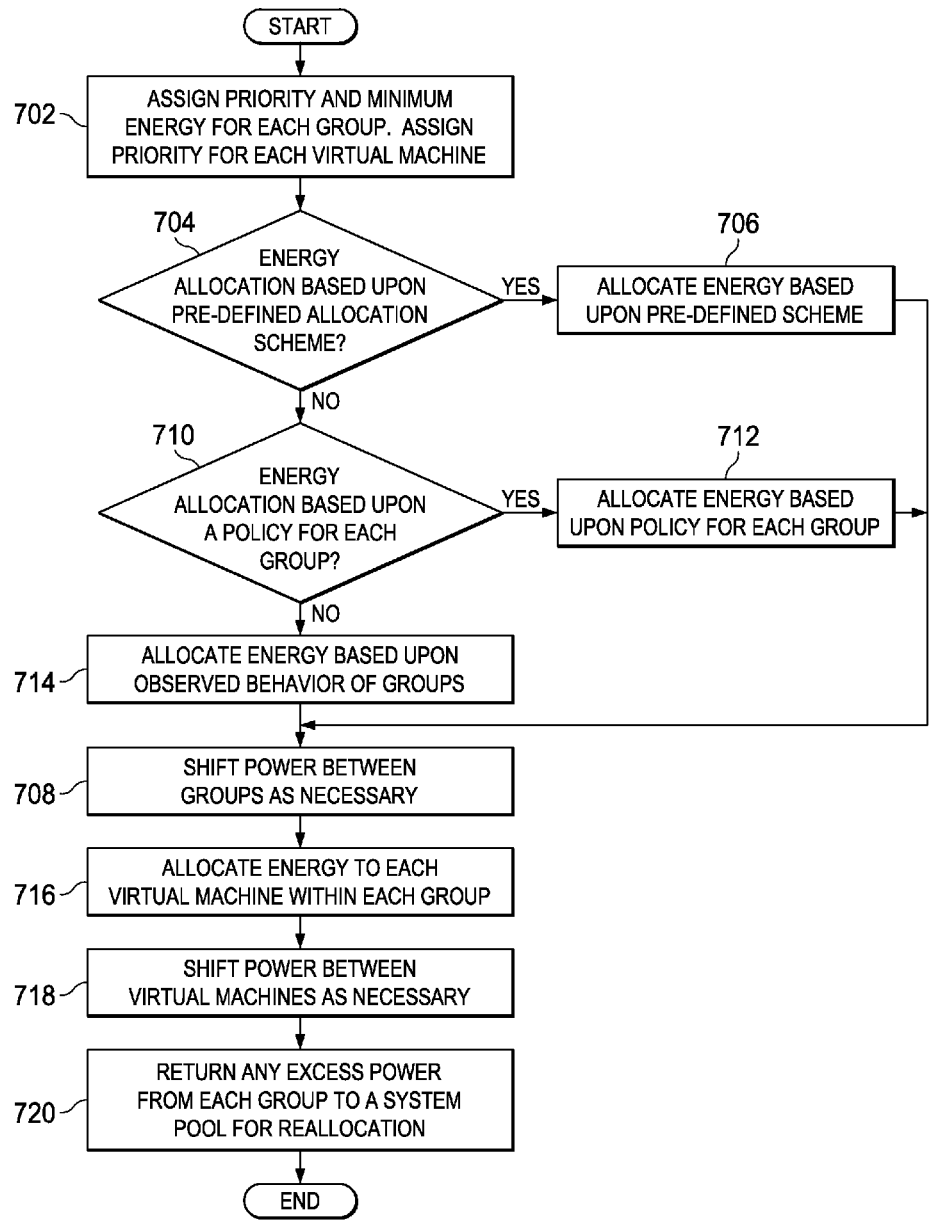
FIG. 7 is an illustration of a flowchart of a process for managing energy in accordance with an illustrative embodiment.

With reference now to FIG. 7, an illustration of a flowchart of a process for managing energy is depicted in accordance with an illustrative embodiment. The process illustrated in FIG. 7 may be implemented in an energy management environment, such as energy management environment 400 in FIG. 4. In particular, this process may be implemented by energy manager 440 in FIG. 4.

The process begins by assigning a group priority and a minimum energy to each group of virtual machines and assigning a priority to each virtual machine (step 702). For example, with reference to FIG. 4, the process assigns group priorities 434 and 438, minimum energies 432 and 436, and priorities 412, 416, 420, 426 and 430, any of which may be used in conjunction with a policy 446 for allocating energy to groups 408 and 422. Thereafter, the process determines whether a policy for energy allocation is based on a predefined energy allocation scheme (step 704). If the policy is based upon a pre-defined energy allocation scheme, the process allocates the energy to the groups based on the pre-defined energy allocation scheme (step 706). For example, the process may allocate a fixed percentage of total energy available to each group. The total amount of energy available for allocation may be determined, for example, by energy budget 444. The process then shifts energy between groups of virtual machines as necessary (step 708). For example, one group may require more energy at a later point of time.

With reference again to step 704, if energy allocation is not based on a pre-defined energy allocation scheme, the process determines whether the policy for energy allocation is based on a policy for each group (step 710). If the policy for energy allocation is based upon a policy for each group, then the process allocates the energy for the groups based on the policy for each group (step 712). For example, each group may have a different energy allocation policy based on unique energy demands. The process then shifts energy between groups of virtual machines as necessary (step 708).

With reference again to step 710, if energy allocation is not based on a policy for each group, the process allocates the energy for the groups based on an observed behavior of the groups (step 714). For example, energy may be allocated for the groups based upon an observed behavior of the groups during a previous time interval. The process then shifts energy between groups of virtual machines as necessary (step 708).

With reference again to step 708, energy may be shifted between groups based on priorities assigned to each group, minimum energy required for each group, changing energy needs, or other criteria. Thereafter, the process allocates energy to each virtual machine within each group (step 716). Energy may be allocated to each virtual machine within each group based on a policy in conjunction with priorities assigned to each virtual machine or other criteria. Thereafter, the process shifts energy between virtual machines as necessary (step 718). Energy may be shifted between virtual machines based on priorities assigned to each virtual machine, minimum energy required for each group or virtual machine, changing energy needs, or other criteria. Thereafter, the process returns excess energy from each group to a computer system pool for reallocation (step 720). For example, a group may have excess energy due to inactivity or reduced demand for services provided by the group. Thereafter, the process terminates.

Figure 8:
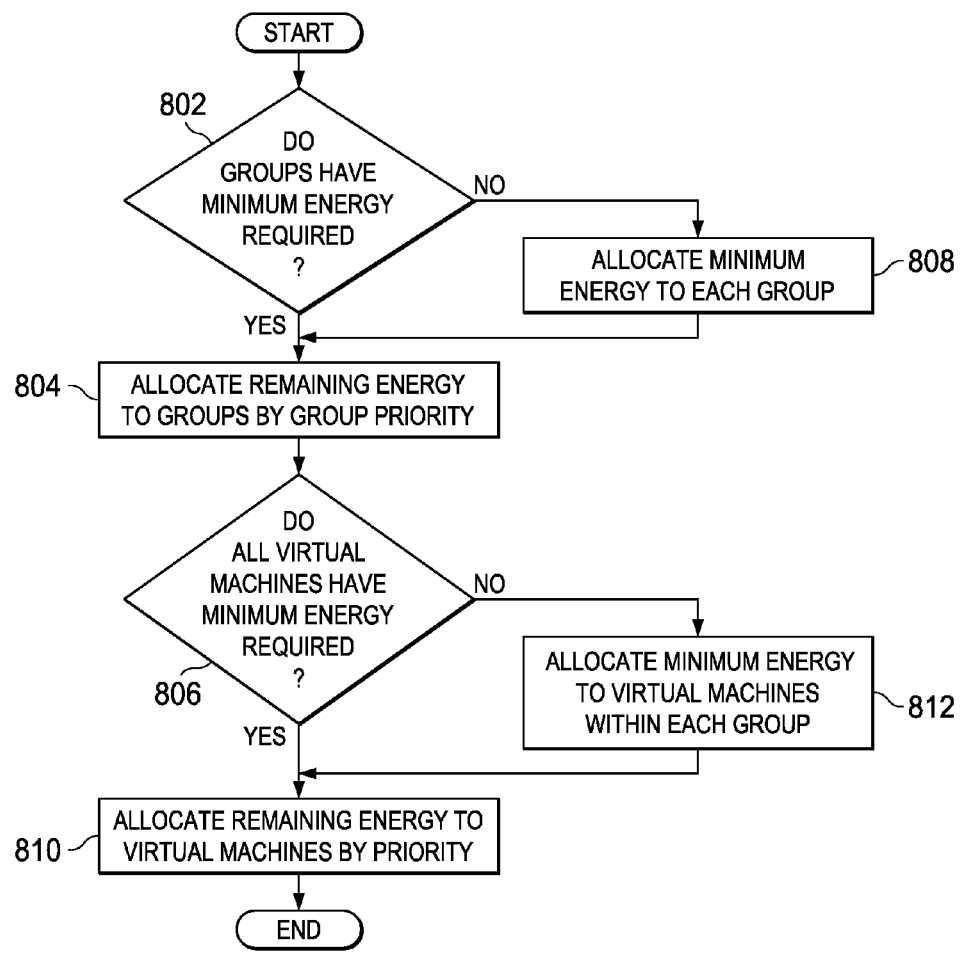
FIG. 8 is an illustration of a flowchart of a process for managing energy in accordance with an illustrative embodiment.

With reference now to FIG. 8, an illustration of a flowchart of a process for managing energy is depicted in accordance with an illustrative embodiment. The process illustrated in FIG. 8 may be implemented in an energy management environment, such as energy management environment 400 in FIG. 4. In particular, this process may be implemented by energy manager 440 in FIG. 4.

The process begins by determining whether the groups have a minimum amount of energy required for each group (step 802). For example, with reference to FIG. 4, the process determines if group 408 is allocated at least minimum energy 432 and if group 422 is allocated at least minimum energy 436. If the groups have a minimum amount of energy required for each group, then the process allocates remaining energy to the groups by group priority (step 804). For example, the remaining energy may be allocated to the groups according to policy 446. Thereafter, the process determines if all virtual machines have a minimum amount of energy required (step 806).

With reference again to step 802, if the groups do not each have the minimum amount of energy required, the process allocates minimum energy to each group (step 808). In some cases, there may not be enough energy to meet minimum energy requirements for each group. If this occurs, energy may be allocated by group priority. For example, if group 408 has a higher priority than group 422, then the energy will be allocated to group 408 until it has been allocated a minimum energy 432; then the remaining energy may be allocated to group 422, even though there may not be enough energy left to satisfy minimum energy 436 of group 422. After the process allocates minimum energy to each group (step 808), the process allocates remaining energy to the groups by group priority (step 804). Thereafter, the process determines if all virtual machines have a minimum amount of energy required (step 806).

At step 806, if all virtual machines have a minimum amount of required energy, then the process allocates the remaining energy to the virtual machines by priority (step 810). For example, the remaining energy may be allocated to the virtual machines according to policy 446. The process then terminates.

With reference again to step 806, if the virtual machines do not each have the minimum amount of energy required, the process allocates minimum energy to the virtual machines within each group (step 812). In some cases, there may not be enough energy to meet minimum energy requirements for each virtual machine. If this occurs, energy may be allocated by priority. For example, if virtual machine 410 has a higher priority 412 than virtual machine 414, then the energy within group 408 will be allocated to virtual machine 410 until it has been allocated a minimum amount of energy; then the remaining energy may be allocated to virtual machine 414, even though there may not be enough energy left to satisfy the minimum amount of energy specified for virtual machine 414. After the process allocates minimum energy to the virtual machines within each group (step 812), the process allocates remaining energy to the virtual machines by priority (step 810). The process then terminates.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the invention is a method, data processing system, and computer program product for managing energy. A processor unit identifies a plurality of groups of virtual machines in a computer system. The processor unit allocates the energy in the computer system to the plurality of groups of virtual machines based on a policy.

The invention provides advantages over current processes for managing energy. For example, current processes manage energy for an entire physical machine. However, these processes do not provide the degree of energy control provided by the invention. A higher degree of energy control may be desired because less energy is wasted. When less energy is wasted, cost saving may be realized. Moreover, some applications running on a system may be more critical than other applications.

For example, applications may be organized into groups of virtual machines. One group of virtual machines may have more critical applications than another group of virtual machines. Thus, if an energy shortage occurs, any available energy may be routed to the critical groups of virtual machines. Therefore, downtime may be minimized or eliminated for critical applications.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, semiconductor system (apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output, or I/O devices (including but not limited to keyboards, displays, pointing devices, etc.), can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing energy, the method comprising:
    identifying, by a processor unit, a plurality of groups of virtual machines in a computer system, wherein each group of virtual machines has assigned a group priority and a minimum energy, and wherein each virtual machine in the group of virtual machines has assigned a virtual machine priority, and wherein the minimum energy specifies a minimum amount of energy required for a group, for respective virtual machines in the group to operate at a predetermined level of performance and wherein each virtual machine in the group specifies a minimum energy for a respective virtual machine to operate at a predetermined level of performance; and
    allocating, by the processor unit, for a next time interval, energy in the computer system from an energy budget to the plurality of groups of virtual machines using criteria comprising the energy budget and a policy, selected from a set of policies, in conjunction with the group priority, the minimum energy and the virtual machine priority, wherein the next time interval is next in a sequence of time divided into intervals;
    shift an energy allocation between groups based on criteria comprising priorities assigned to each group, a minimum energy required for each group, and a change in energy needs, in response to a determination to shift energy between groups in the plurality of groups of virtual machines;
    allocate, for the next time interval, the energy in the computer system from the energy budget to the virtual machines within each group of virtual machines using criteria comprising a policy selected from the set of policies in conjunction with priorities associated to each virtual machine; and
    shift the energy allocation between the virtual machines based on criteria comprising priorities assigned to each virtual machine, the minimum energy required for each group, the minimum energy required for the virtual machine, and the change in energy needs in, response to a determination to shift energy between virtual machines in a particular group of virtual machines.

2. The method of claim 1, wherein allocating, by the processor unit, the energy in the computer system for the next time interval to the plurality of groups of virtual machines based on the policy comprises:
    allocating, by the processor unit, the energy in the computer system for the next time interval to the plurality of groups of virtual machines based on the policy selected from, at least one of a pre-defined allocation scheme, including a scheme from a most restrictive to a least restrictive one of, equal shares, fixed specific shares, reservation with recapture of unused energy by other groups, and reservation with release of unused energy for energy-saving actions, and observation based on demand, a policy for each group of virtual machines, and an observed behavior of each group of virtual machines, and wherein a share of energy for each group is adjusted at different time intervals based upon a policy based allocation.

3. The method of claim 1, wherein allocating, by the processor unit, the energy in the computer system for the next time interval to the plurality of groups of virtual machines based on policy comprises:
    allocating, by the processor unit, the energy for the next time interval to each virtual machine within a group of virtual machines in the plurality of groups of virtual machines using a power management scheme including one of a priority based power capping of virtual machines, a client specific based power capping of virtual machines, power and energy accounting for virtual machines, and energy budgets for each virtual machine.

4. The method of claim 1 further comprising:
    determining whether a group of virtual machines in the plurality of groups of virtual machines has an excess amount of the energy allocated to the group: and
    responsive to determining that the group of virtual machines has the excess amount of the energy, returning at least a portion of the excess amount of the energy for the next time interval to a computer system pool for reallocation.

5. The method of claim 1 further comprising:
    determining whether a first group of virtual machines in the plurality of groups of virtual machines has an excess amount of the energy allocated to the first group; and
    responsive to determining that the first group of virtual machines has the excess amount of the energy, shifting at least a portion of the excess amount of the energy for the next time interval to a second group of virtual machines.

6. The method of claim 1 further comprising:
    determining whether a first virtual machine in a group of the plurality of groups of virtual machines has an excess amount of energy allocated to the first group; and
    responsive to determining that the first virtual machine in the group of the plurality of groups of virtual machines has the excess amount of the energy, shifting at least a portion of the excess amount of the energy for the next time interval to a second virtual machine in the group of the plurality of groups of virtual machines.

7. The method of claim 1, wherein allocating, by the processor unit, the energy in the computer system for the next time interval to the plurality of groups of virtual machines based on the policy comprises:
    allocating, by the processor unit, the energy in the computer system for the next time interval to the plurality of groups of virtual machines based on an amount of the energy used by the plurality of groups of virtual machines during a previous time interval.

8. The method of claim 1 further comprising:
associating a minimum energy allocation with at least one group of the plurality of groups of virtual machines.

9. The method of claim 1 further comprising:
associating a minimum energy allocation with at least one virtual machine in a group of the plurality of groups of virtual machines.

10. The method of claim 1 further comprising:
determining whether an energy demand of the plurality of groups of virtual machines exceeds the energy in the computer system; and
responsive to determining that the energy demand of the plurality of groups of virtual machines exceeds the energy in the computer system, allocating the energy for the next time interval to each group of virtual machines of the plurality of groups of virtual machines using a priority assigned to each group of virtual machines wherein the energy is allocated to a higher priority group to satisfy a minimum energy of the higher priority group before the energy is allocated to a lower priority group.

11. The method of claim 1 further comprising:
determining whether an energy demand of the plurality of groups of virtual machines exceeds the energy in the computer system; and
responsive to determining that the energy demand of the plurality of groups of virtual machines exceeds the energy in the computer system, allocating the energy for the next time interval to each virtual machine in a group of the plurality of groups of virtual machines using a priority assigned to each virtual machine in the group of virtual machines wherein the energy is allocated to a higher priority virtual machine to satisfy a minimum energy of the higher priority virtual machine before the energy is allocated to a lower priority virtual machine.

\* \* \* \* \*